March 15, 1966          R. S. GUTOW ETAL          3,241,001
            CONDITION RESPONSIVE CONTROL NETWORK
                    Filed Sept. 4, 1962
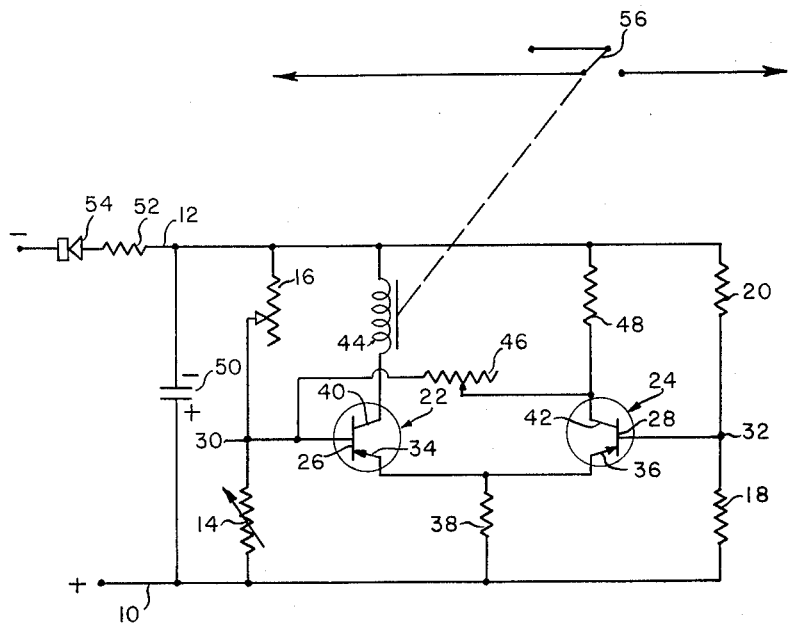
                                    INVENTORS
                                PAUL A. MICHAELS
                                RUSSELL S. GUTOW
                        BY     Scrivener & Parker
                                        ATTORNEYS

3,241,001
CONDITION RESPONSIVE CONTROL NETWORK

Russell S. Gutow, Detroit, and Paul A. Michaels, Livonia, Mich., assignors to The Bendix Corporation, Southfield, Mich., a corporation of Delaware
Filed Sept. 4, 1962, Ser. No. 221,029
2 Claims. (Cl. 317—148.5)

The present invention relates to electrical control networks which are automatically responsive to a condition and more particularly to a control network which is especially, but not exclusively, adapted to the control of an electrical motor subject to overheat conditions.

The broad object of the invention is the provision of a simple, inexpensive, reliable, condition responsive electrical network adapted to automatically energize and de-energize circuitry for controlling a load element such as a motor in response to predetermined conditions.

Though it will be apparent that the present invention is susceptible of controlling a wide variety of electrically operated devices, it will be described in connection with the energizing and de-energizing of an electric motor in response to overheat conditions existing in the motor. The object of the invention is accomplished by the provision of a transistorized circuit which is supplied with direct current from a suitable source and includes a bridge circuit comprising pairs of series connected voltage dividing resistors which are connected in parallel to the source of direct current. Connected between the resistors of each pair are the respective bases of a pair of transistors whose base potential biases are controlled by the pairs of resistors. One of the resistors is of the type which changes in resistance value in response to a change in the temperature condition to which the resistor is exposed; that is to say, the resistor is of the type known as a thermistor whose resistance is of a high order when cool, but decreases as the temperature of the thermistor increases. As will become more fully apparent hereinafter, under normal conditions the transistor whose base bias is controlled by the thermistor, is normally conducting but, when the temperature condition rises above a predetermined safe value, the second transistor, which is normally retained nonconducting, becomes conducting and through a regenerative feedback circuit exerts or superimposes an additional bias on the base of the first transistor so that it is rendered nonconducting thereby de-energizing circuitry controlling the protected device.

A particular feature resides in the fact that when the regenerative feed-back circuit is energized it exerts an opposing bias on the base of the first transistor so that it is prevented from being conducting by a wide margin whereby there is a distinct difference in temperature levels at which the first transistor becomes conducting and nonconducting.

A preferred embodiment of the invention is shown in the single figure illustrating the essential components of an electrical network arranged in a system in accordance with the invention.

In the drawing, a network is shown which essentially comprises a source of direct electrical current represented by conductors 10, 12, and two pairs of series connected resistors 14, 16 and 18, 20 all of which constitute a voltage dividing bridge. The resistor 14 of the first pair is of the condition responsive variety such as a thermistor whose resistance varies inversely with temperature. The second resistor 16 of the first pair is of the variable or rheostat variety, for purposes that will become apparent, whereas the second pair of resistors 18, 20 are both of the fixed variety.

The network of the drawing includes a pair of transistors 22, 24 whose respective bases 26, 28 are connected to the junctions 30, 32 between the respective pairs of resistors 14, 16 and 18, 20. The transistors illustrated are of the P-N-P variety and have emitters 34, 36 which have a common connection through a resistor 38 with one junction of the pairs of resistors and with this arrangement, it will be apparent that both emitters are supplied with the same potential which is normally a function of the supply voltage. The respective transistors 22, 24 have collectors 40, 42 the first of which is connected in series with an electrically responsive load device such as the relay 44 shown. The collector 42 of the second transistor 24 is connected through feedback resistor 46, which may be of the variable or rheostat variety, to the base 26 of the first transistor 22. In addition to being connected to the collector 42, the resistor 46 is connected to the other junction of the pairs of resistors through a resistor 48. Where the direct current is supplied from an alternating source of current a suitable capacitor 50 may be supplied across the conductors 10, 12 and a small resistor 52 may be provided in series with a diode rectifier 54. Connected to the relay 44 for control thereby is a normally open switch 56 which is moved to closed position upon energization of the relay to complete the circuit to the motor (not shown) which is to be controlled by the network of the invention.

In operation, under normal temperature conditions, that is to say when the motor is operating in its normal cool temperature range, the resistance of the thermistor 14 is extremely high and the resistance of the second resistor 16 is selected so that a strong negative potential is exerted on the base 26 of the transistor 22 whereby the transistor is saturated so that current flows freely from the emitter 34 through the collector 40 and thence through the relay 44 to energize the same and move the switch 56 to closed position. The same emitter potential which is exerted on the emitter 34 of transistor 22 is also supplied through the common resistor 38 to the emitter 36 of the second transistor 24 and the resistances of the second pair of resistors 18, 20 are selected so that normally a potential is exerted on the base 28 of transistor 24 which is positive with respect to the normal emitter potential whereby, under safe operating temperature conditions, transistor 24 is retained nonconducting and the network operates as if the transistors were not a part thereof.

Assume now that because of loss of lubricant or for some other cause, the temperature of the controlled motor commences to rise. As the temperature increases, the resistance of the thermistor falls thus driving the potential exerted on the base 26 of transistor 22 in a positive direction with respect to the potential of emitter 34. At the same time the emitter potential of both transistors 22, 24 moves in a positive direction resulting in the potential of all three of the electrodes of transistor 22 being decreased together. However, the resistances of resistors 16, 38 are selected so that the potential of base 26 of transistor 22 moves at a greater rate in a positive direction than the emitter potential so that when the motor temperature has reached a predetermined level, the base potential is at a level which is only slightly negative with respect to emitter potential whereby the transistor enters a linear amplifying mode of operation and the collector-emitter potential of collector 40 and emitter 34 thus increases. At this point, the relay remains energized and because of the selection of the resistances of resistors 18, 20 the potential bias on the base 28 of the second transistor 24 is still slightly positive with respect to the potential of the emitter 36 and the transistor remains nonconducting. Upon slight further increase in motor temperature, the emitter potential of transistor 24 reaches a point which is slightly positive with respect to the potential of base 28 whereby transistor 24 becomes conducting so that the collector 42 thereof becomes more positive. This voltage change is coupled through the feedback resistor 46 with the base 26 of the transistor 22 to drive the base slightly more in the positive direction. This causes transistor 22 to be immediately cut-off and open the circuit to relay 44 to de-energize the same and to permit the switch 56 to move to its open position to stop the motor.

Those skilled in the art recognize that when a transistor is in a linear amplifying condition the emitter potential is not alone a function of the supply voltage but is also a function of the transistor forward current gain. Thus when the transistors 22, 24 are both in linear amplifying stages, the additional increment of positive potential supplied from the collector 42 of transistor 24 through the resistance 46 to the base 26 of transistor 22 is regenerative in nature and is of a size to move the potential of base 26 sufficiently far to be positive with respect to the potential of emitter 34 so that transistor 22 becomes instantaneously nonconducting with consequent de-energization of the relay 44. Thereafter, the transistor 24 rapidly traverses the linear amplifying region and becomes saturated so that the base 26 of the transistor 22 becomes highly positive with respect to the emitter to retain transistor 22 by a considerable margin in its nonconducting condition.

As the motor cools down, the resistance of thermistor 14 increases which causes the base potential of transistor 22 to become increasingly negative. At this stage the transistor 24 remains in its saturated condition but as the temperature continues to fall, the potential of base 26 of transistor 22 becomes nearly equal to the emitter and collector potentials of transistor 24 (these being substantially equal to each other when a transistor is saturated) so that both ends of the resistor 46 are approximately at the same potential and no current flows therethrough to the base 26 of transistor 22. It will of course be apparent that the potential on emitter 36 of transistor 24 is likewise impressed on emitter 34 of transistor 22 and thus when the potential impressed on base 26 is equalized (due to the increasing resistance of the cooling thermistor 14) with the potential of emitter 34, then transistor 22 once again becomes conducting to energize the relay 44 and close switch 56 to restart the motor. At this point, the transistor 24 is driven out of its saturated condition through regenerative action similar to that described above and the circuit is restored to its initial cool motor condition.

The table below lists representative values for the various resistors of an actual network which has performed satisfactorily in a motor control system constructed in accordance with the invention. The actual network employed commercial P-N-P transistors manufactured by Tung-Sol and known as model TS-601 and was supplied with a direct current source of 20 volts with each resistor being rated at one half watt:

| | |
|---|---|
| Resistance of thermistor 14 | 100K ohms at 25° C. |
| Resistor 16 | 12K ohms. |
| Resistor 18 | 3K ohms. |
| Resistor 20 | 3.6K ohms. |
| Resistor 38 | 1K ohms. |
| Resistance of relay 44 | 1K ohms. |
| Resistor 46 | 4.3K ohms. |
| Resistor 48 | 2K ohms. |

The resistors 16 and 46 are of the variable variety in order that their resistances may be changed as desired to vary the temperature range between energization and de-energization of the relay. The values given in the foregoing table for resistors 14 and 46 are the settings which have given satisfactory results though it will be obvious that fixed resistors of equivalent or different values could be employed. For use as a motor control, the thermistor would be located in the motor housing in close adjacency to the windings with the remainder of the network being confined within a suitable container located exteriorly of the motor.

In practice the circuit of the invention has proved rapid in response and exceptionally stable. Because under normal temperature conditions, the base and emitter potentials are directly proportional to supply voltage, variation in this over a fairly large spread does not effect the responsiveness of the network. Furthermore, the ability of the circuit to respond to two different conditions, i.e., to de-energize at one temperature level and re-energize at another less than the first, avoids hunting and permits the motor to cool to a safe level and re-operate in a safe temperature range for a period of time before cutting out. Thus in a refrigerating system even if the motor is suffering from a partial derangement causing overheat conditions, it will retain the refrigerating system partially operative until repairs can be effected. This is much desirable over safety systems which cut out and in at substantially the same temperature level so that the motor can never operate sufficiently long to effect cooling of the refrigerated space, and when it does operate it does so at a maximum temperature level close to the danger point.

It will be apparent that the system of the invention is susceptible to changes and modifications. For example, instead of P-N-P type transistors, N-P-N type might be used in which event the only difference would be the reversal of the signs (accompanied by a reversal of the diode 54) described for the P-N-P transistors shown. It will be obvious that the network need not be confined to the control of a motor but is equally applicable to the control of any device in response to a condition. For example, instead of the thermistor, a motion responsive rheostat might be employed which upon a predetermined degree of movement of a controlled element, provides a resistance of a predetermined level to energize or de-energize a relay or other device to effect control of the element.

These and other changes and uses are within the scope and spirit of the claims appended hereto.

What is claimed is:

1. In a temperature responsive control system the combination of a direct current source, first and second pairs of resistors, each pair respectively connected in series across said source to provide a voltage dividing bridge, a resistor of said first pair comprising a thermistor whose resistance varies inversely with temperature change, first and second transistors having their respective bases connected to the junction of the resistors of each pair and their emitters connected together in parallel relationship through a common resistor with one junction of said pairs of resistors whereby the emitter potential of both of said transistors varies simultaneously and to the same degree in accordance with changes in the resistance of said thermistor, the collectors of said first and second transistors being connected in parallel to the second junction of said pairs of resistors, the collector circuit of said first transistor including normally-energized series-connected electromagnetic relay means and the collector circuit of said second transistor including a series connected resistor, and a regenerative feed back circuit including a series connected resistor connecting the collector circuit of said second transistor to the base of said first transistor, the resistances of said resistors being selected that when said first transistor is conducting said second is non-conducting and vice versa, the collector potential of said second transistor when in conducting condition being impressed on the base of said first transistor to retain said first transistor biased by a wide margin in a non-conducting condition whereby said relay is energized and de-energized at substantially different degrees of temperature.

2. A condition-responsive electrical control system, comprising a normally-balanced temperature-responsive bridge network including a pair of parallel-connected branches a first one of which includes a thermistor connected in series with an adjustable resistor and the other of which includes a pair of series-connected additional resistors;

means applying a direct-current potential across the pair of junctions connecting the branches of said bridge network;

a pair of alternately-conductive transistors each including emitter, collector and base electrodes, one of said transistors being normally conductive;

means including a common resistor connecting the emitter electrodes of said transistors with that junction of said bridge network that is adjacent said thermistor;

means connecting the base of said normally conducting transistor with the connection between said thermistor and said adjustable resistor, and means connecting the base of said second transistor with the connection between said pair of fixed resistors;

normally-energized relay means connecting the collector electrode of said normally-conductive transistor with the other junction of said bridge network, and means including a collector resistor connecting the collector electrode of the other transistor with said other junction; and regenerative feedback means including an adjustable feedback resistor connecting the collector electrode of said second transistor with the base of said first transistor, the resistances of said resistors being so selected that when said first transistor is conducting said second transistor is non-conducting and vice versa, said feedback resistor having a resistance value to bias said first transistor non-conductive by a wide margin when said second transistor is conductive, whereby said relay means is energized and de-energized at substantially different temperatures, respectively.

References Cited by the Examiner
UNITED STATES PATENTS

| | | | |
|---|---|---|---|
| 2,859,402 | 11/1958 | Schaeve. | |
| 2,939,018 | 5/1960 | Faulkner | 317—148.5 |
| 3,041,477 | 6/1962 | Budts et al. | 307—88.5 |
| 3,104,346 | 9/1963 | Marshall | 317—148.5 |
| 3,105,175 | 9/1963 | Siliani et al. | 317—153 X |
| 3,136,877 | 6/1964 | Heller | 317—153 X |
| 3,175,076 | 3/1965 | Fox et al. | |
| 3,175,077 | 3/1965 | Fox et al. | |
| 3,182,222 | 5/1965 | Lacy et al. | 317—153 XR |

SAMUEL BERNSTEIN, *Primary Examiner.*